United States Patent [19]

Shundo

[11] Patent Number: 5,399,442
[45] Date of Patent: Mar. 21, 1995

[54] SOLID ELECTROLYTE FUEL CELL

[75] Inventor: Hiroyuki Shundo, Kawasaki, Japan

[73] Assignee: Fuji Electric Co., Ltd., Kawasaki, Japan

[21] Appl. No.: 128,037

[22] Filed: Sep. 29, 1993

[30] Foreign Application Priority Data

Feb. 8, 1993 [JP] Japan .................. 5-019116
Jul. 20, 1993 [JP] Japan .................. 5-178407

[51] Int. Cl.⁶ .............................................. H01M 8/12
[52] U.S. Cl. .................................... 429/32; 429/39
[58] Field of Search ........................ 429/32, 38, 39

[56] References Cited

U.S. PATENT DOCUMENTS

| | | | |
|---|---|---|---|
| 4,490,445 | 12/1984 | Hsu . | |
| 4,766,043 | 8/1988 | Shirogami et al. . | |
| 4,910,100 | 3/1990 | Nakanishi et al. .............. | 429/32 |
| 5,085,950 | 2/1992 | Primdahl ............................ | 429/32 X |
| 5,149,601 | 9/1992 | Shiratori et al. . | |
| 5,186,806 | 2/1993 | Clark et al. ....................... | 429/32 X |
| 5,268,806 | 12/1993 | Meacham ......................... | 429/39 X |

FOREIGN PATENT DOCUMENTS

| | | |
|---|---|---|
| 0361383 | 4/1990 | European Pat. Off. . |
| 0451971 | 10/1991 | European Pat. Off. . |
| 4004271 | 8/1990 | Germany . |
| 2-168568A | 6/1990 | Japan . |
| 2-267869A | 11/1990 | Japan . |
| 2-284362 | 11/1990 | Japan .............. H01M 8/24 |
| 3-8264 | 1/1991 | Japan . |
| 3-55764 | 3/1991 | Japan .............. H01M 8/24 |
| 3-129675 | 6/1991 | Japan .............. H01M 8/24 |
| 3-219563 | 9/1991 | Japan . |
| 4-75262A | 3/1992 | Japan . |

Primary Examiner—Stephen Kalafut
Attorney, Agent, or Firm—Spencer, Frank & Schneider

[57] ABSTRACT

A planar solid electrolyte fuel cell includes a plurality of separators and electric insulators superposed one on another alternately in respective manifold parts of the separators. Each of the separators has a manifold part in the center thereof which are provided with two gas introduction holes and a reaction part provided with guide vanes surrounding the manifold part and for flowing reaction gases. Unit cells on porous substrates are each in the form of an annular plate with a single central hole. The separators sandwich the unit cells in the respective reaction parts thereof. Gas seal parts are provided around gas introduction holes, and gas seal parts are provided between the reaction parts of the separators and inner peripheral parts of the unit cells.

11 Claims, 12 Drawing Sheets

SOLID ELECTROLYTE FUEL CELL

BACKGROUND OF THE INVENTION

1. Field of the Invention

The present invention relates to a solid electrolyte fuel cell and more particularly to a solid electrolyte fuel cell having a stack construction with improved thermal reliability.

2. Description of the Prior Art

Fuel cells using oxide solid electrolyte such as zirconia, which operate at high temperatures such as 800° to 1,100° C., not only exhibit high power generation efficiencies but also need no catalyst. Such fuel cells are easy to handle since the electrolytes used are solid. For this reason, it is expected that they will be employed as third generation fuel cells.

However, the conventional solid electrolyte fuel cells are difficult to realize since they are susceptible to thermal damage because of the use of ceramics as their main construction components and the lack of a suitable method for providing seals for gases. Fuel cells having special forms, e.g., a cylindrical form, have been designed to solve the above-described problems have been and run successfully. However, the cylindrical fuel cells gave low power generation densities per volume of unit cell, and there has been no indication that they can provide economically advantageous fuel cells.

FIG. 1 is an exploded perspective view showing a conventional planar or plate-like solid electrolyte fuel cell. As is well known, it is necessary to make fuel cells planar in order to increase power generation density. A fuel cell of this type includes a unit cell 17, and a separator plate 18. The unit cell 17 includes a solid electrolyte plate 17A which is of ceramics and electrodes 17B and 17C. Two separator plates 18,18 of ceramics and one unit cell 17 are alternately superposed one on another. In other words, the unit cell 17 is sandwiched by the two separator plates 18, 18. The separator plates are each formed with first grooves and second grooves on different surfaces, running at right angles to each other, through which grooves different reaction gases flow, respectively. The reaction gases are introduced respectively thorough gas manifolds (not shown) into the fuel cell.

For, example, in order to feed the reaction gases sufficiently and separately into the fuel cell, it becomes necessary to prevent leakage of gases between the unit cell 17 and the separator plate 18 around the periphery of the unit cell. To this end, it would seem to be a possible solution to render the unit cell 17 and the separator plate 18 integral by sintering them together. However, this method would be unsuccessful since the unit cell and the separator plate are-made of different materials and thermal stress could appear which would lead to cracks in the sintered body if there is even a slight difference in coefficient of thermal expansion or nonuniform temperature distribution between the materials. Accordingly, is has been contemplated to prevent leakage of gases using sealing materials.

Japanese Patent Application Laying-open No. 267869/1990 discloses a solid electrolyte fuel cell which comprises a unit cell having a solid electrolyte on whose main surface are arranged an anode and a cathode, and first and second substrates sandwiching the unit cell and feeding reaction gases thereto, the resulting structure being superposed via an interconnector, in which (1) the first and second substrates have guide vanes arranged thereon that guide the reaction gases from the central parts toward the peripheral parts of the main surfaces, (2) the fuel cell includes reaction gas inlet pipes penetrating a stack composed of the first and second substrates, the unit cell, and the interconnector, in the central part thereof in the direction of the stack, the pipes being formed with gas ports on side surfaces thereof and for diffusing the gases toward the guide vanes, and (3) a glass seal is provided in spaces between the reaction gas inlet pipes and the inner periphery of the unit cell.

Japanese Patent Application Laying-open No. 168568/1990 discloses a solid electrolyte fuel cell having a construction similar construction to that described in the above-cited publication in which a glass seal is provided in spaces between the first and second substrates and between the reaction gas inlet pipes as reaction gas feeding means. Optimally, a glass seal may be provided in spaces between the outer peripheral surface of the unit cell, and spaces between the outer peripheral surface and the reaction gas feeding means.

Japanese Patent Application Laying-open No. 75262/1992 discloses a solid electrolyte fuel cell which comprises a plurality of first ribbed porous substrates each having on one surface thereof a unit cell, a plurality of second ribbed porous substrates each having on one surface thereof an interconnector, the first and second ribbed substrates being superposed one on another alternately, and first and second manifolds for feeding fuel gas and oxidant gas, respectively. The fuel cell further comprises a gas impermeable layer and a gas seal part. The unit cell is composed of three layers, i.e., an anode, a solid electrolyte and a cathode. Each first ribbed porous substrate has ribs which guide the fuel gas from the first manifold toward the peripheral part thereof on a surface opposite to the surface on which the unit cell is superposed. On the other hand, the second ribbed porous substrate has ribs which guide the oxidant gas from the second manifold toward the peripheral part thereof on a surface opposite to the surface on which the interconnector is superposed. The gas seal part is composed of a silver O-ring which is provided around the oxidant gas feeding manifold in the first ribbed porous substrate, and around the fuel gas feeding manifold in the second ribbed porous substrate. The gas impermeable layer is an O-ring made of glass or ceramics and intervenes between the gas seal parts and the ribbed porous substrates. Gas seal parts may be provided around the oxidant gas feeding manifold part in the anode and around the fuel gas feeding manifold part in the cathode, on the outer peripheral part of the first ribbed porous substrate, etc., as necessary.

The use of the seal materials requires further improvement in the stability of the gas seal since both unit cells and separators are made of ceramics.

SUMMARY OF THE INVENTION

Under the circumstances, the present invention has been made.

Therefore, an object of the present invention is to provide a solid electrolyte fuel cell which is highly reliable by adopting a cell construction having a stabilized gas sealing property without causing thermal destruction of the ceramics.

The present invention provides a planar solid electrolyte fuel cell comprising: (1) a plurality of separator plates made of a metal, each having: a manifold part and a reaction part surrounding the manifold part, the manifold part being provided with two reaction gas introduction holes, and the reaction part being provided with first guide vanes on one surface thereof and second guide vanes on another surface thereof for flowing and distributing reaction gases therein separately; (2) a plurality of unit cells, each being in the form of an annular plate, and having an anode, a solid electrolyte and a cathode superposed one on another, each of the unit cells being sandwiched by two of the separators; (3) a plurality of electric insulators arranged on the central part of the separators, respectively, and being provided with two through holes aligned with the reaction gas introduction holes extending in a direction of the thickness of the separators, the electric insulators and the separators being superposed one on another through the manifold parts of the separators, respectively; (4) first gas seal parts arranged between the manifold parts of the separators and the electric insulators, respectively, and for sealing off the reaction gases from the respective reaction gas introduction holes; and (5) second gas seal parts arranged between respective peripheral portions of the unit cells and the respective reaction parts of the separators sandwiching the unit cells.

Here, the first and second gas seal parts may each be made of a mixture of glass and ceramic material.

The separators may be made of a heat resistant metal.

The separators may be made of a heat resistant stainless steel.

The respective cathode sides of the separators may be provided with an antioxidant layer.

The antioxidant layer may be made of $LaXO_3$ wherein X is Mn, Cr or Co.

The unit cells may be in the form of an annular plate formed with a single hole.

The unit cells may each be a set of sectors.

The solid electrolyte fuel cell may further comprise gas flow holes through which the reaction gas introduction holes in the manifold parts communicate with the reaction parts of the separators.

The solid electrolyte fuel cell may further comprise gas flow holes and gas uniform distribution chambers, the gas flow holes communicating the gas uniform distribution chambers with the reaction gas introduction holes in the manifold parts of the separators.

The unit cell may be a unit cell assembly having a porous substrate serving as one of the anode and the cathode, and the solid electrolyte and the rest of the anode and cathode are superposed on the porous substrate one on another in this order.

According to the present invention, the reaction gases flow radially with respect to an annular, planar or flat plate-like unit cell, which makes distribution of temperature in the unit cell point-symmetrical, thus decreasing thermal destruction of the ceramics used.

Moreover, according to the present invention, stability of the sealing property increases since the gas seal parts are formed via separators made of a metal.

The above and other objects, effects, features and advantages of the present invention will become more apparent from the following description of embodiments thereof taken in conjunction with the accompanying drawings.

DESCRIPTION OF PREFERRED EMBODIMENTS

Hereinafter, the present invention will be described in more detail with reference to the attached drawings.

Embodiment 1

Figure 1:
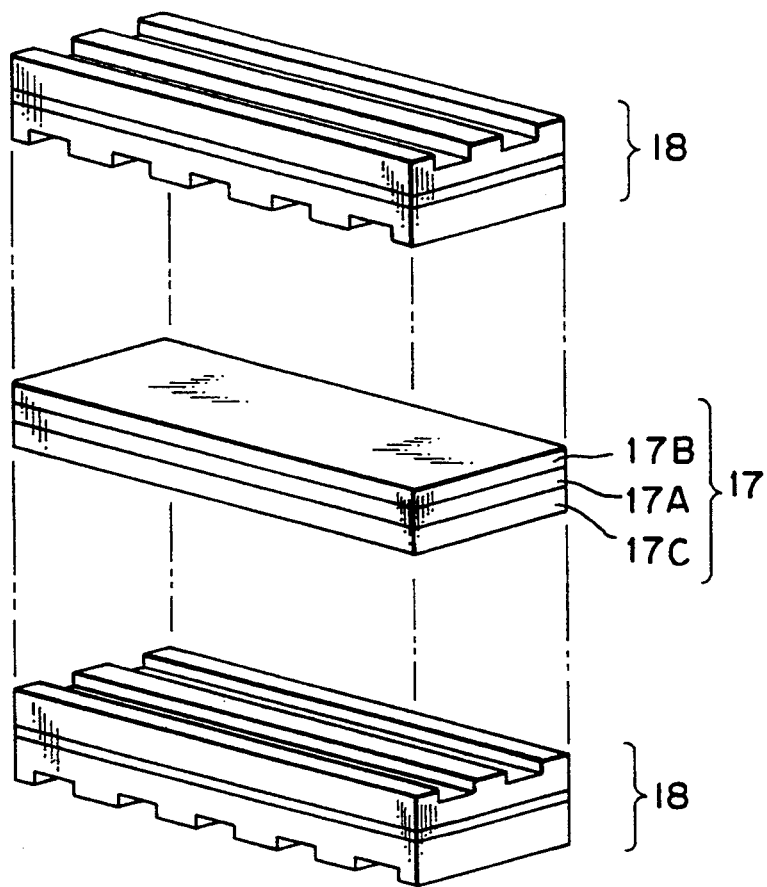
FIG. 1 is an exploded perspective view showing a conventional solid electrolyte fuel cell.
Figure 2:
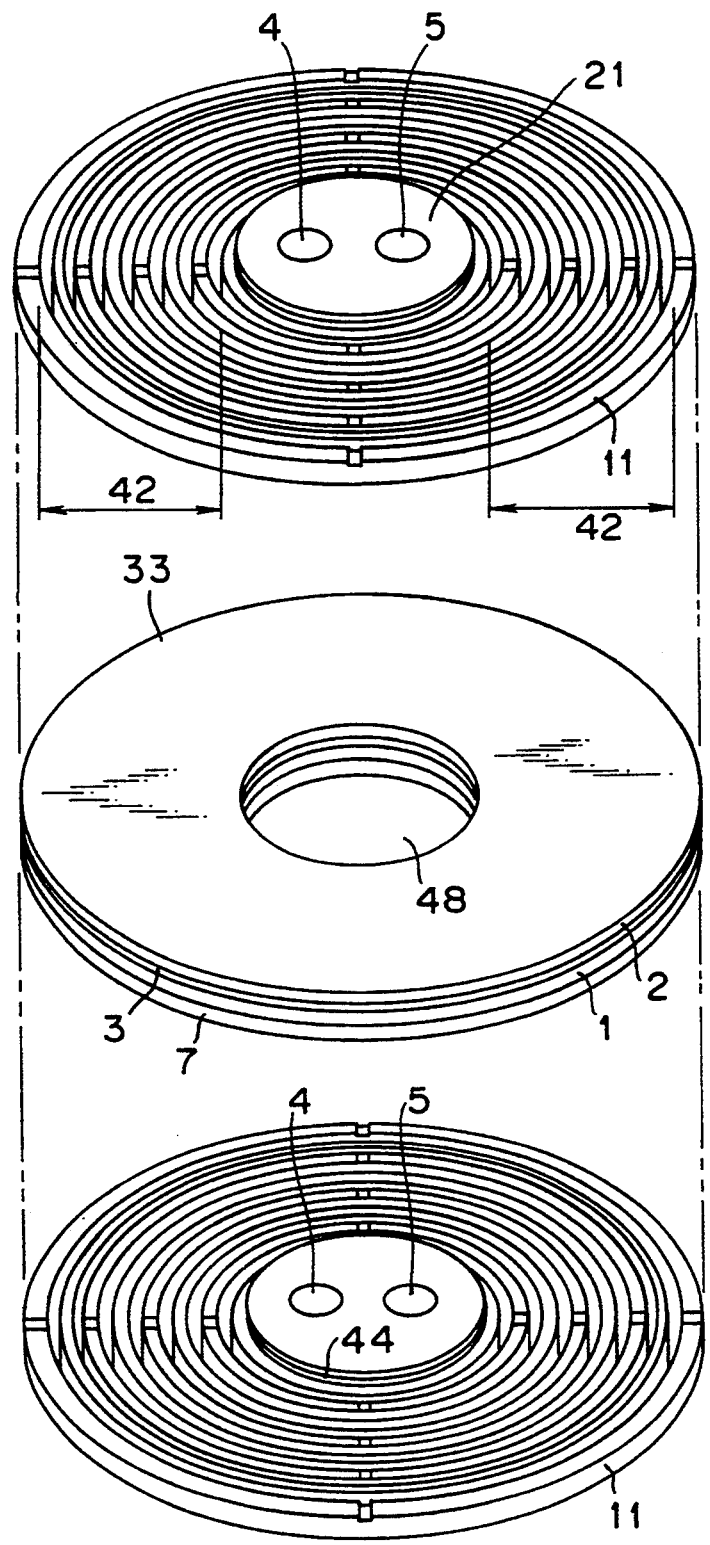
FIG. 2 is an exploded perspective view showing a solid electrolyte fuel cell according to Embodiment 1 of the present invention.
Figure 3:
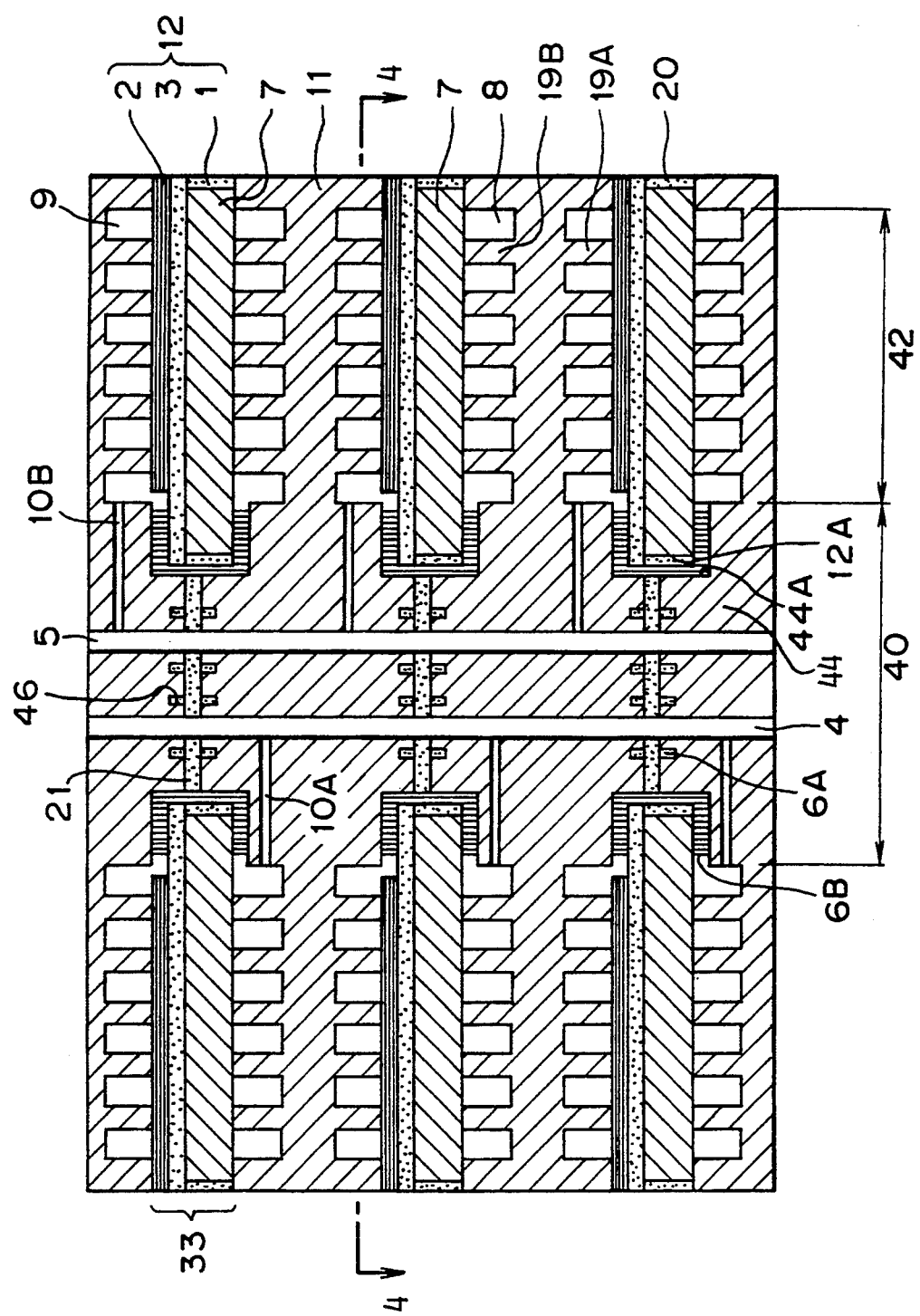
FIG. 3 is a cross sectional view taken along line 3—3 in FIG. 4 showing a solid electrolyte fuel cell according to Embodiment 1 of the present invention.

FIG. 2 is an exploded perspective view showing a solid electrolyte fuel cell according a first embodiment of the present invention; FIG. 3 is a cross sectional view taken along line 3—3 in FIG. 4 showing the solid electrolyte fuel cell according to the first embodiment of the present invention; and FIG. 4 is a cross sectional view taken along line 4—4 in FIG. 3 showing the solid electrolyte fuel cell according to the first embodiment of the present invention.

Figure 4:
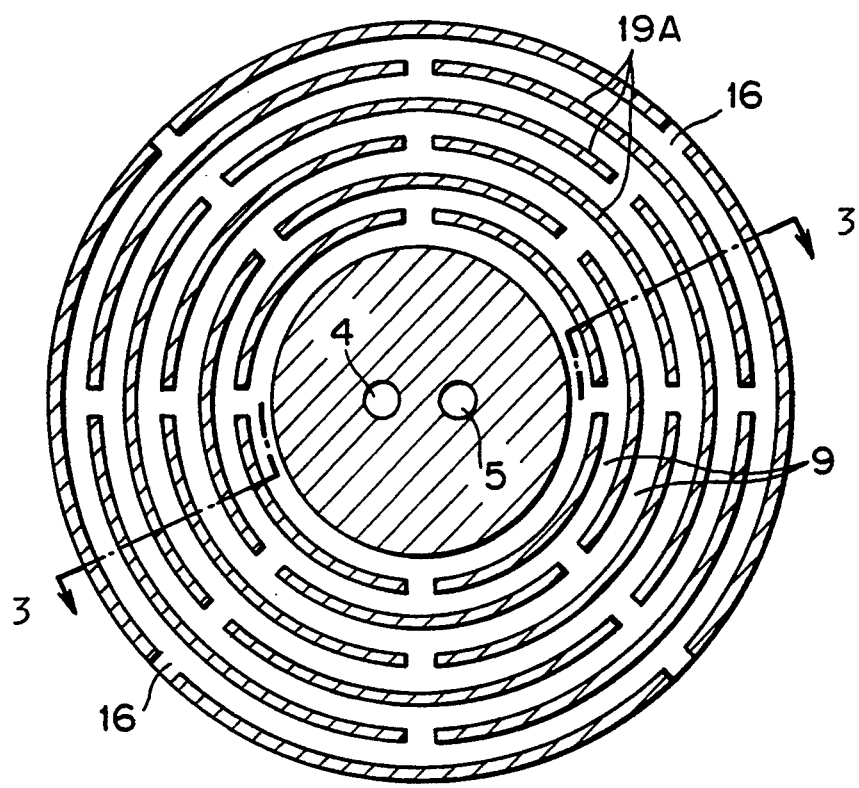
FIG. 4 is a cross sectional view taken along line 4—4 in FIG. 3 showing a solid electrolyte fuel cell according to Embodiment 1 of the present invention.

As shown in FIGS. 2 to 4, separators 11 have a manifold part or region 40 and a reaction part or region 42 surrounding the manifold part 40 superposed one on another via electric insulator plates 21 provided in the manifold part. The separators 11 sandwich a unit cell assembly 33 in the reaction part 42.

A first gas seal portion 6A prevents leakage of gases from gas introduction holes 4 and 5, respectively. A second gas seal portion 6B is formed between the reaction region of the separator 11 and an inner peripheral part 12A of a unit cell 12 and prevents leakage of gases between the reaction parts 42 of the separators 11 adjacent one another.

In the central parts 40 of the separators serving as manifold parts, there are formed the gas introduction holes 4 and 5 for introducing therethrough fuel gas and oxidant gas, respectively. The manifold parts 40 of the separators 11 have protrusions 44. The protrusions 44 are formed with grooves 46 for inserting therein the gas seal portion 6A. The reaction part or region 42 of each separator 11 surrounding the manifold part thereof is provided with first and second sets of guide vanes 19A and 19B arranged on both surfaces thereof. The manifold part 40 of each separator 11 is formed with gas flow holes 10A and 10B, as by drilling, which communicate with the gas introduction holes 4 and 5, respectively, and lead fuel and oxidant gases to the guide vanes 19B and 19A, respectively.

The electric insulator 21, which is a dense disk made of ceramic, is provided with two through holes that match or are aligned with the gas introduction holes 4 and 5, respectively, to make a continuous gas conduit for supplying reaction gases, when the electric insulator 21 is superposed on the separator.

Unit cells 12, which are each an annular disk formed with an inner hole 48, each include an anode 1, a solid electrolyte 3, and a cathode 2 that are superposed or laminated in this order on a porous substrate 7 having the Same form as the unit cell. Two separators 11 sandwich a unit cell 12 so that the protrusions 44 of the separators 11 and the electric insulator 21 superposed thereon are arranged in the inner hole 48 of the unit cell with a suitable allowance between an inner peripheral surface 44A of the protrusion 44 and the electric insulator 21, and an inner peripheral surface 12A of the unit cell 12. One of the unit cells 12 and the respective reaction parts 42 of two of the separators 11 that sandwich the unit cell 12 therebetween define a fuel gas chamber 8 and an oxidant gas chamber 9 on opposite sides of the unit cell 12. In FIG. 3, the oxidant gas chamber is formed on the side of the cathode 2 while the fuel gas chamber 8 is formed on the side of the anode 1.

Fuel cells of the aforementioned type can be fabricated as follows. First, there is formed a porous substrate 7 of 2 mm thickness using Ni—$ZrO_2$ (nickel-zirconia) cermet. Then, Ni—$ZrO_2$ cermet is plasma-sprayed on a flat surface of the porous substrate to form a porous anode 1 of 50 $\mu$m thickness. Further, yttria-stabilized zirconia is plasma-sprayed on the anode 1 to form a dense solid electrolyte 3 of 100 $\mu$m thick. Subsequently, lanthanum-strontium-manganite (La(Sr)M-$nO_3$) is plasma-sprayed on the solid electrolyte 3 to form a porous cathode 2 of 50 $\mu$m thickness. Then, a central part thereof is removed by processing to form a hole to obtain a unit cell 12 in the form of an annular disk. Glass is impregnated on the inner and outer peripheral surfaces of the porous substrate 7 to provide a gas impermeable layer 20.

On the other hand, a separator 11 of 7 mm thickness is formed of stainless steel on both surface of which there are formed guide vanes 19A and 19B. Then, gas communication holes 10A and 10B communicating the gas introduction holes 4 and 5 with the guide vanes 19A and 19B are formed by discharge processing.

The gas seal parts 6A and 6B are made of a mixture of glass and ceramic. The gas seal parts 6A and 6B can provide a liquid seal since the glass component therein becomes liquid at about 1000° C. at which solid electrolyte fuel cells are operated.

Oxygen gas, which is an oxidant gas, is led from the oxidant gas introduction hole 5 to the oxidant gas chamber 9 in the reaction part of the separator 11 through the gas flow hole 10B. Hydrogen gas, which is a fuel gas, is led through the fuel gas introduction hole 4 to the fuel gas chamber 8 in the reaction part of the separator 11 via the gas flow hole 10A. The oxidant gas is exhausted from gas exhaust ports 16 arranged concentrically every 90° (FIG. 4). Gas outlet ports for the fuel gas, defined between the guide vanes 19B which are concentrically arranged, distribute concentrically every 180° rather than 90° since the flow rate of the fuel gas is low.

The oxidant gas and fuel gas exhausted from the reaction part keep the temperature of the fuel cell within a predetermined temperature range. The gases are utilized as heat sources for preheating the reaction gases.

The oxygen gas arriving at the cathode 2 is reduced to oxygen ions, which diffuse through the solid electrolyte 3 to the surface of the anode 1 where they are oxidized and react with hydrogen gas to form water vapor. A free energy change in the reaction of forming water vapor from hydrogen gas and oxygen gas is converted into electric energy, with a negative voltage being generated on the anode 1 and a positive voltage on the cathode 2. The voltage per unit cell is 0.5 to 0.9 V, and a predetermined voltage can be obtained by piling up unit cells.

In the case of the fuel cell having the aforementioned construction, it is only necessary that the porous substrate 7 on which the anode 1, the solid electrolyte 3 and the cathode 2 are formed and the separator 11 be superposed or piled up one on another alternately in order to obtain a fuel cell. This allows the porous substrates 7 and the separators 11 to move freely and independently of each other during thermal expansion, with the result that no thermal stress occurs. The gas seal part 6A arranged around the fuel gas introduction hole 4 and the gas seal part B arranged between the inner peripheral part of the unit cell 12 and separator 11 are solidified after operation of the fuel cell is stopped. However, this does not raise problem. Glass has a coefficient of thermal expansion greater than zirconia and other electrode materials and hence the gas seal parts after the solidification occupy smaller volumes, thus avoiding damages such as cracks to the other electrode materials. Since the thermal stresses given by the gas seal parts are small, the total thermal stress remains small. The gas seal parts 6A and 6B are made of a mixture of glass and a ceramic material and are filled in respective seal grooves (not shown) formed with the separator 11 which is made of a metal. This construction gives rise to a highly stable sealing performance.

The contour of unit cells is usually an annular disk. However, it is not limited thereto but may be rectangular, ellipsoidal polygonal. The contour of the guide vanes of the separator may be designed freely taking into consideration uniform gas distribution.

Embodiment 2

Figure 5:
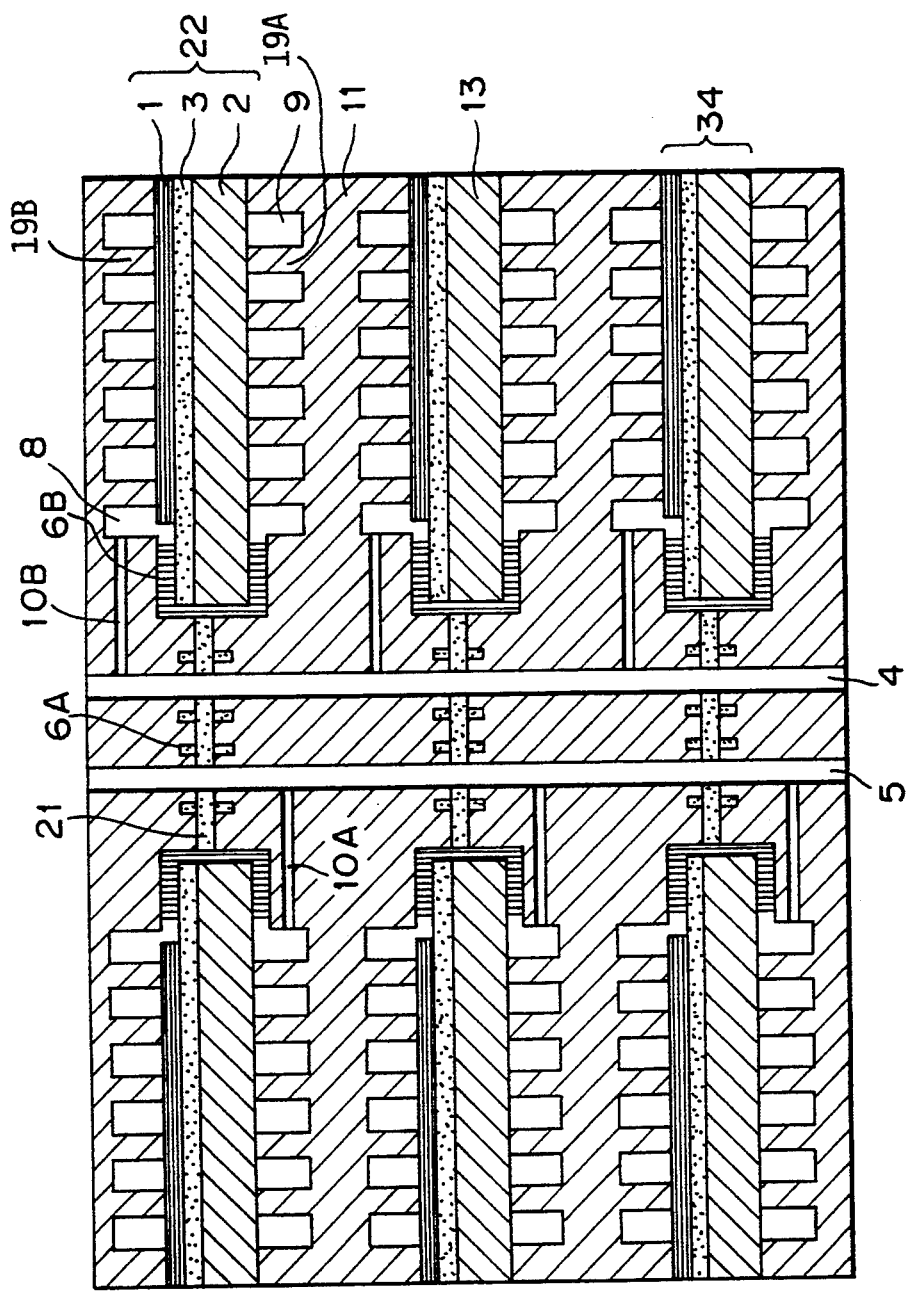
FIG. 5 is a cross sectional view showing an example of the arrangement of a solid electrolyte according to Embodiment 2 of the present invention.

FIG. 5 is a cross sectional view showing an example of the arrangement of a solid electrolyte according to a second embodiment of the present invention.

In this embodiment, the separator and gas seal parts have the same structures as in Embodiment 1 but the unit cell structure and the composition of the porous substrate differ from those of the fuel cell described in Embodiment 1 above.

On a porous substrate 13 which serves as a cathode 2 there are superposed a solid electrolyte 3 and an anode 1 to form a unit cell assembly 34. A unit cell 22 and the separator 11 are superposed one on another alternately. As described above, the manifold part of each separator 11 is provided with a fuel gas introduction hole 4 and an oxidant gas introduction hole 5. In this embodiment, however, the arrangement of reaction gas chambers are reversed. That is, a fuel gas chamber 8 is defined by the anode 1 and the guide vanes 19B while an oxidant gas chamber 9 is defined by the cathode 2 and the guide vanes 19A unlike the fuel cell of Embodiment 1.

A fuel cell of this type can be fabricated as follows. First, a porous substrate 13 of 2 mm thickness is formed using lanthanum-strontium-manganite (La(Sr)MnO$_3$). On a flat surface of the porous substrate 13 thus formed there is plasma-sprayed La(Sr)MnO$_3$ to form a porous cathode 2 of 80 μm thickness. Then, yttria-stabilized zirconia is plasma-sprayed onto the cathode 2 to form a dense solid electrolyte 3 of 100 μm thickness. Subsequently, nickel-zirconia cermet is plasma-sprayed on the solid electrolyte 3 to form a porous anode 1 of 100 m thickness. Finally, a central part of the structure thus obtained is removed by processing to obtain a unit cell assembly 34 in the form of an annular flat plate.

Embodiment 3

Figure 6:
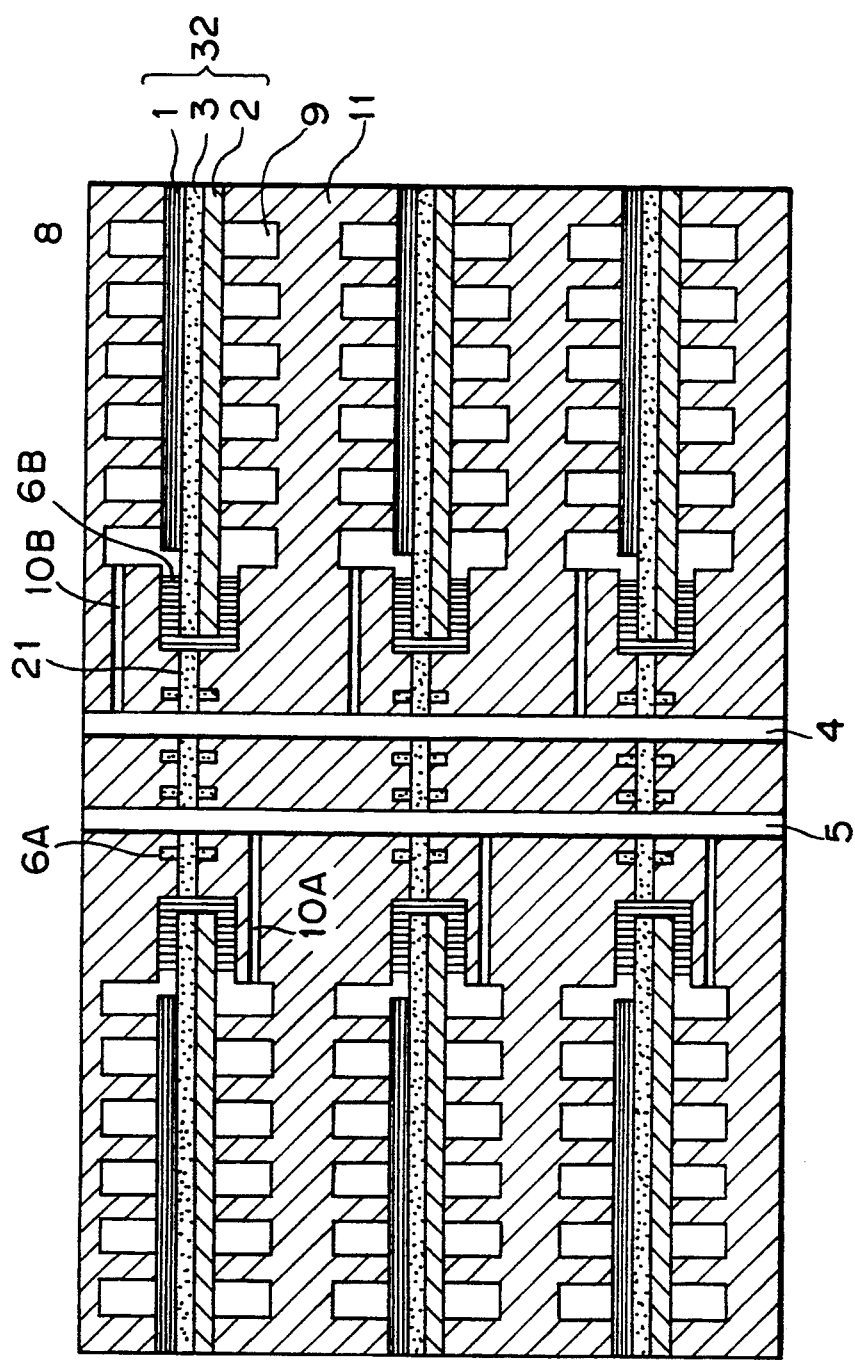
FIG. 6 is a cross sectional view showing an example of the arrangement of a solid electrolyte according to Embodiment 3 of the present invention.

FIG. 6 is a cross sectional view showing an example of the arrangement of a solid electrolyte according to a third embodiment of the present invention.

The solid electrolyte fuel cell of this embodiment is similar to those described in Embodiments 1 and 2 except that it does not include a porous substrate unlike the preceding two embodiments.

A unit-cell 32 is constituted by an anode 1, a solid electrolyte 3 and a cathode 2. The unit, cell 32 and a separator 11 are superposed one on another alternately.

A solid electrolyte fuel cell of this type can be fabricated as follows. First, a dense sintered plate of yttria-stabilized zirconia (YSZ) of 0.5 mm thickness is processed to have a hole in a central part thereof to make an annular plate. Then, a slurry of nickel-zirconia (Ni—ZrO$_2$) cermet is coated on one surface of the annular plate, followed by sintering to form a porous anode 1 of 50 μm thickness. On another surface of the annular plate there is coated a slurry of lanthanum strontium manganite (La(Sr)MnO$_3$), which is then sintered to form a porous cathode 2 of 80 μm thickness. Thus a unit cell 32 is obtained.

Embodiment 4

Figure 7:
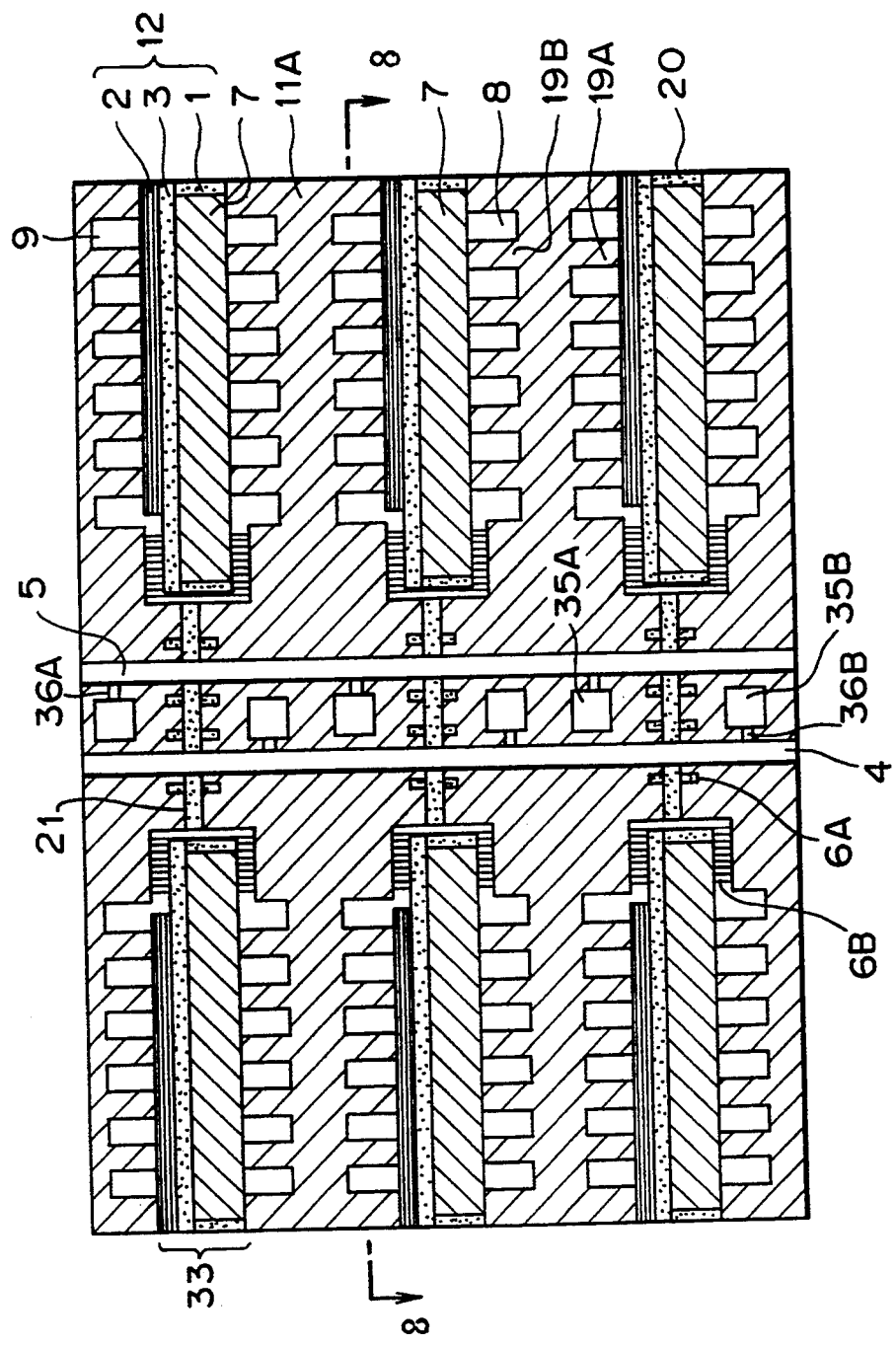
FIG. 7 is a cross sectional view taken along line 7—7 in FIG. 8 showing an example of the arrangement of a solid electrolyte fuel cell according to Embodiment 4 of the present invention.
Figure 8:
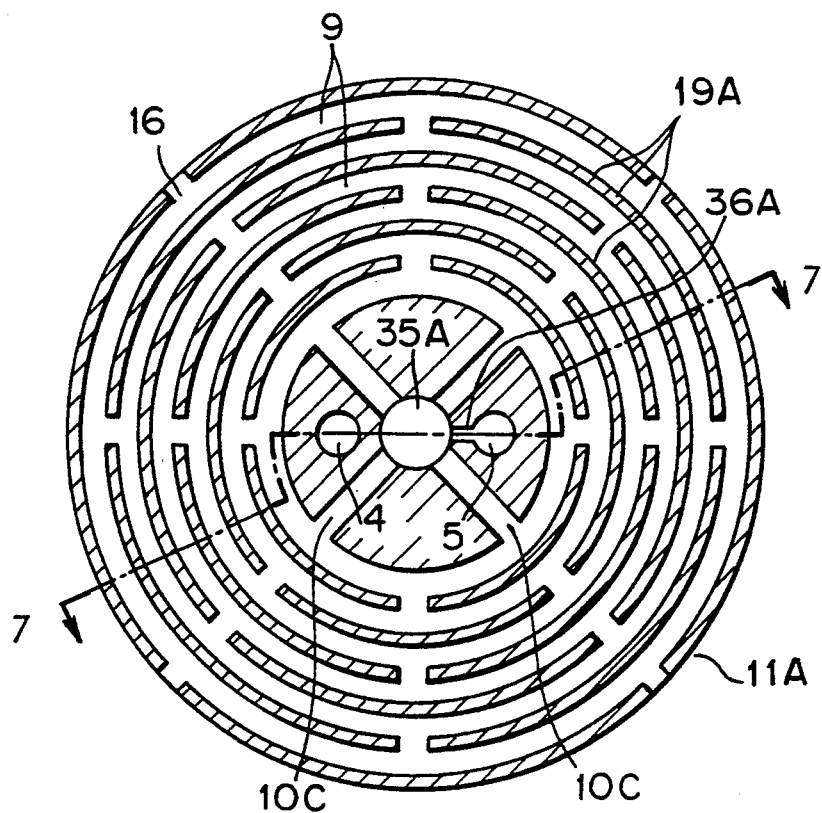
FIG. 8 is a cross sectional view taken along line 8—8 in FIG. 7 showing an example of a solid electrolyte fuel cell according to Embodiment 4 of the present invention.

FIG. 7 is a cross sectional view taken along line 7—7 in FIG. 8 showing an example of the arrangement of a solid electrolyte fuel cell according to a fourth embodiment of the present invention. FIG. 8 is a cross sectional view taken along line 8—8 in FIG. 7.

An oxidant gas is introduced through an oxidant gas introduction hole 5 into a-gas uniform distribution chamber 35A provide in the manifold part 40 of each separator 11A via connection holes 36A in each separator 11A. The connection holes connects the oxidant gas introduction hole with the gas uniform distribution chamber 35A. The oxidant gas is led from the gas uniform distribution chamber 35A to the reaction part surrounding the manifold part via first gas communication hole 10C.

A fuel gas is introduced into a gas uniform distribution chamber 35B through a fuel gas introduction hole 4 via connection holes 36B in each separator. 11A. The fuel gas is led from the gas uniform distribution chamber 35B to a reaction part surrounding the manifold part via second gas communication holes (not shown) arranged similarly to the first gas communication holes.

The gas uniform distribution chambers 35A and 35B are arranged symmetrically on different main surfaces of the separator, respectively. The first and second gas communication holes are arranged on different main surfaces of the separator 11A, respectively.

Other constructions are the same as the solid electrolyte fuel cell described in Embodiment 1 above.

Since the reaction gases are distributed to the reaction part via the gas uniform distribution chambers 35A and 35B, uniformity in distribution of the reaction gases is improved and hence symmetry in reaction gas temperature distribution is improved, thus avoiding the occurrence of the thermal destruction of ceramics.

Embodiment 5

Figure 9:
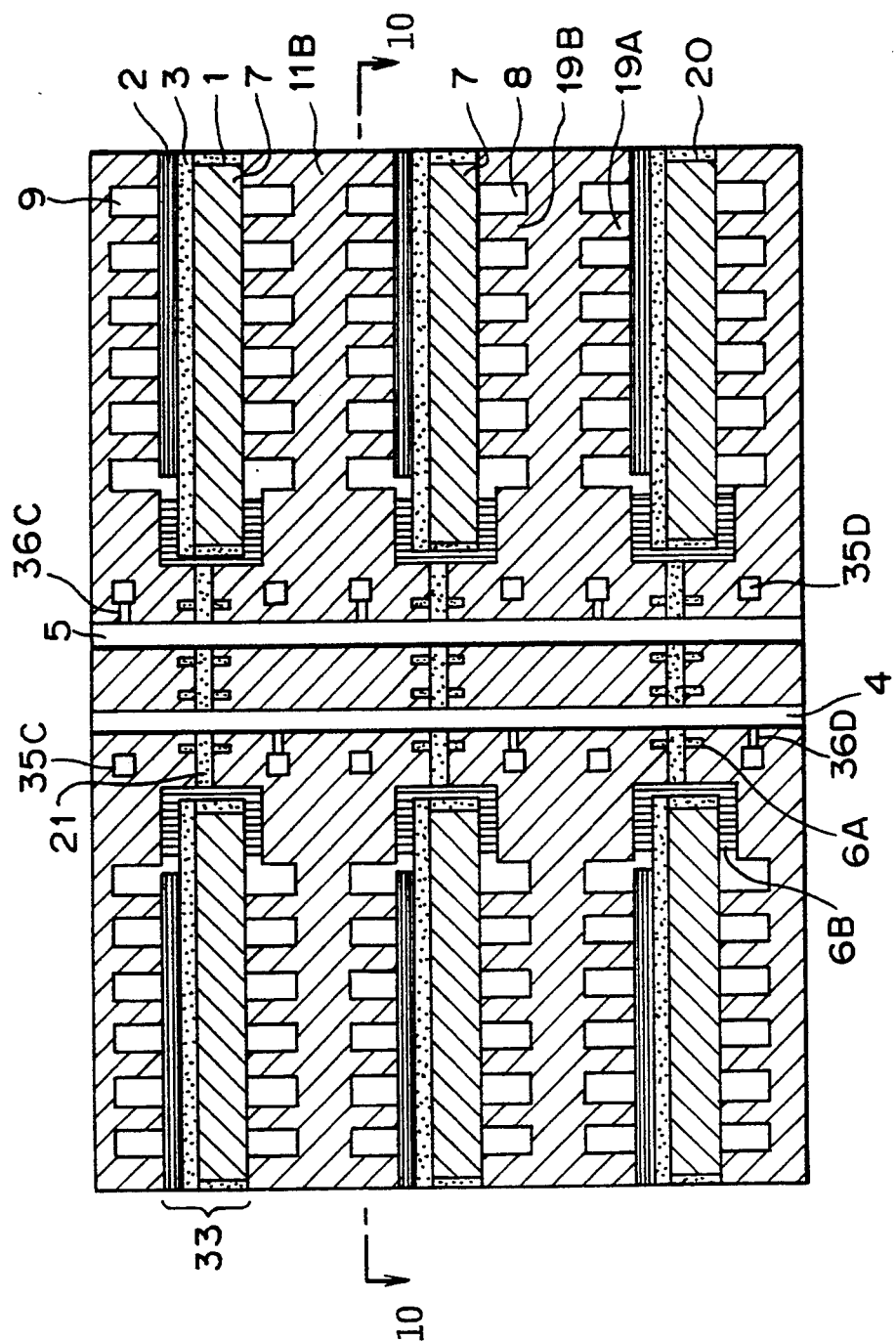
FIG. 9 is a cross sectional view taken along line 9—9 in FIG. 10 showing an example of the arrangement of a solid electrolyte fuel cell according to Embodiment 5 of the present invention.
Figure 10:
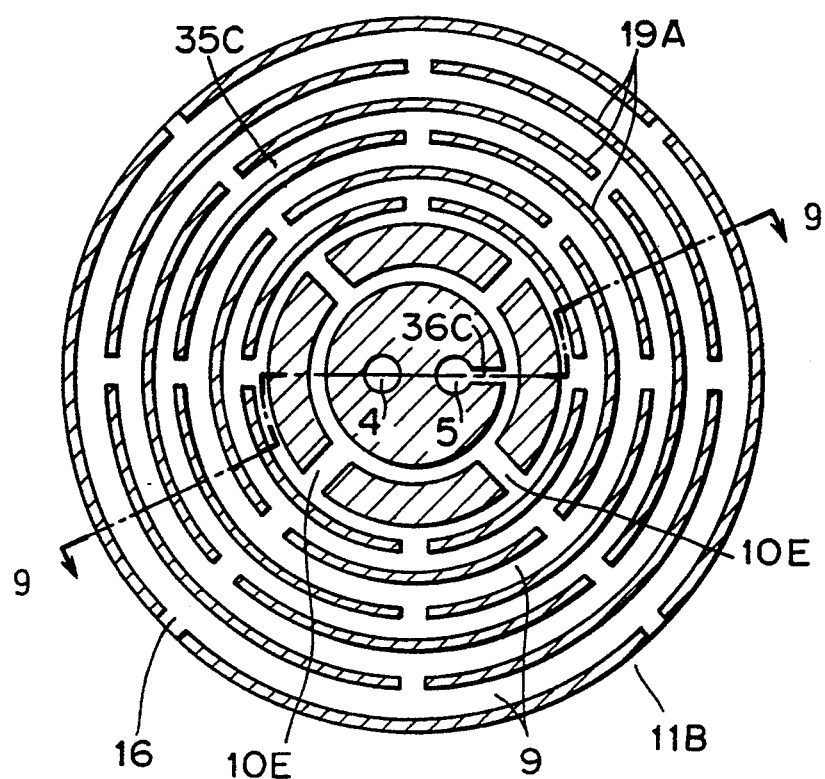
FIG. 10 is a cross sectional view taken along line 10—10 in FIG. 9 showing an example of the arrangement of a solid electrolyte fuel cell according to Embodiment 5 of the present invention.

FIG. 9 is a cross sectional view taken along line 9—9 in FIG. 10 showing an example of the arrangement of a solid electrolyte fuel cell according to a fifth embodiment of the present invention. FIG. 10 is a cross sectional view taken along line 10—10 in FIG. 9.

An oxidant gas is introduced through an oxidant gas introduction hole 5 and via gas communication holes 36C in the separator 11B into a gas uniform distribution chamber 35C, from which the oxidant gas is further led to the reaction part surrounding the manifold part via the gas flow hole 10E.

A fuel gas is introduced through a fuel gas introduction hole 4 via gas communication holes 36D to the gas uniform distribution chamber 35D. The fuel gas is further led from the gas uniform distribution chamber 35D to the reaction part surrounding the manifold part through gas flow holes (not shown) but having the same construction as the first gas flow holes 10E.

The gas uniform distribution chambers 35C and 35D are arranged symmetrically on different main surfaces of the separator, respectively. The first and second gas flow holes are arranged on different main surfaces of the separator 11A, respectively.

Other constructions are the same as the solid electrolyte fuel cell described in Embodiment 1 above.

Since the reaction gases are distributed to the reaction part via the gas uniform distribution chambers 35C and 35C, uniformity in distribution the reaction gases is improved and hence symmetry in reaction gas temperature distribution is improved, thus avoiding the occurrence of thermal destruction of the ceramics.

Embodiment 6

Figure 11:
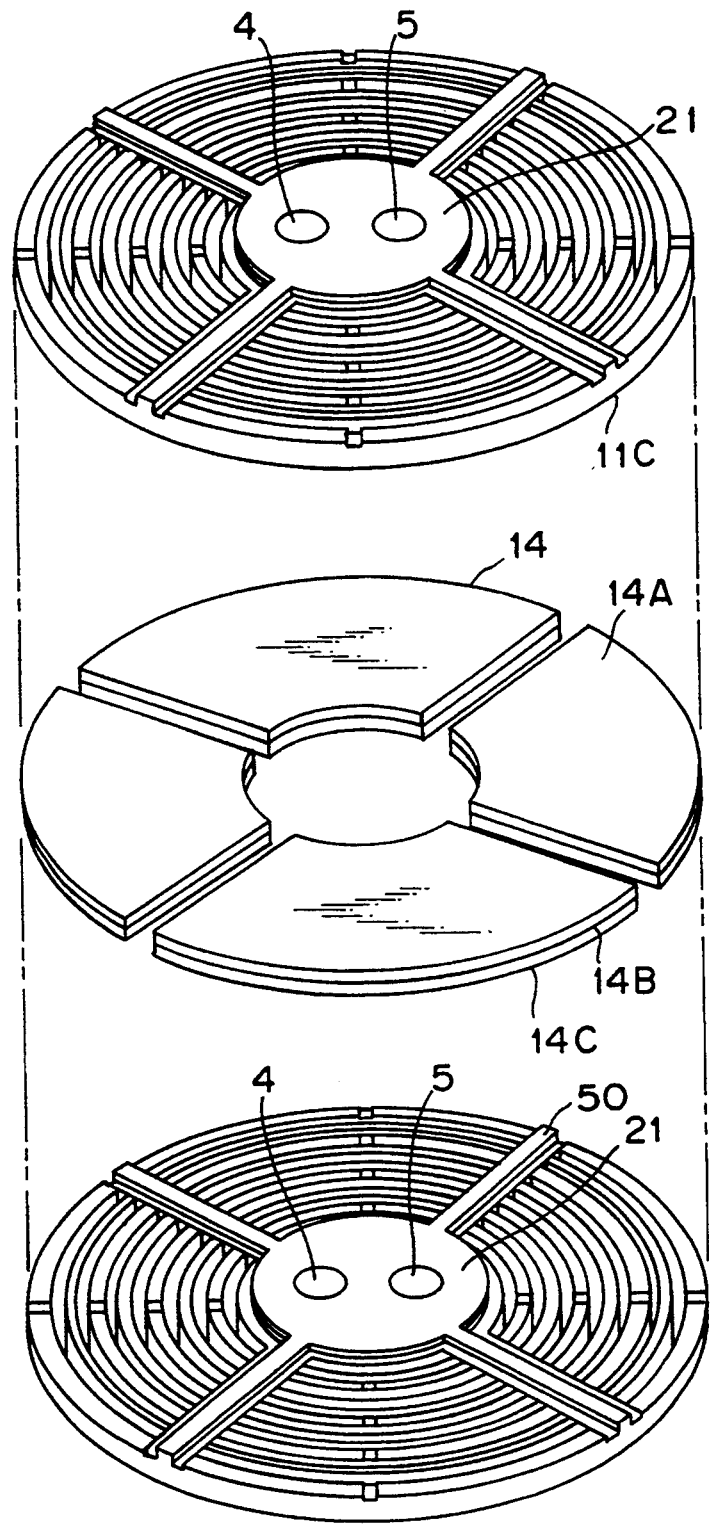
FIG. 11 is an exploded perspective view showing an example of the arrangement of a solid electrolyte fuel cell according to Embodiment 6 of the present invention.
Figure 12:
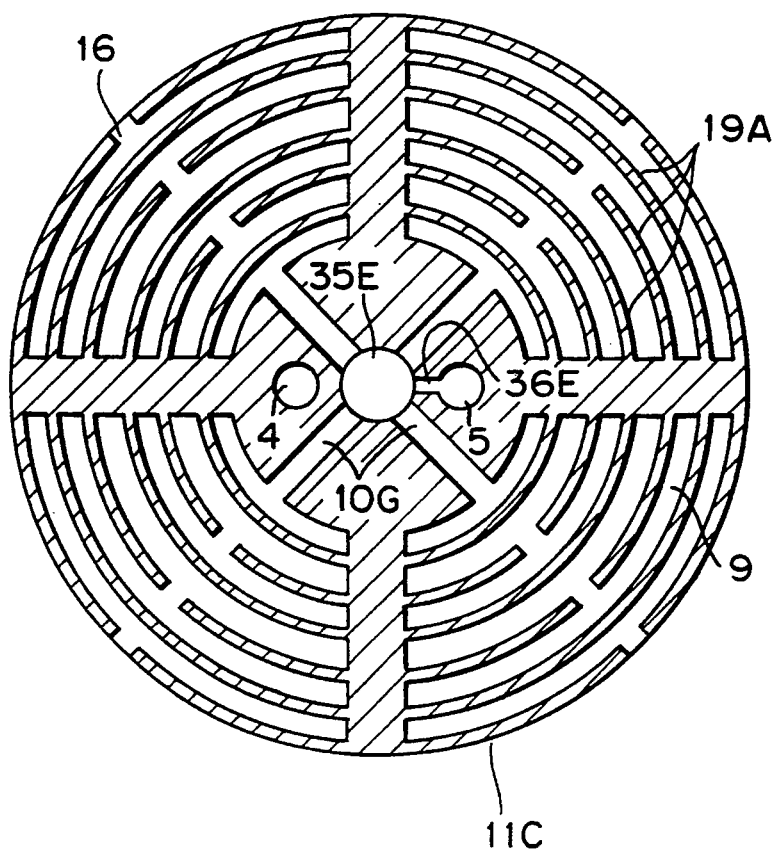
FIG. 12 is a cross sectional view showing an example of the arrangement of a solid electrolyte fuel cell according to Embodiment 6 of the present invention.

FIG. 11 is an exploded perspective view showing an example of the arrangement of a solid electrolyte fuel cell according to a sixth embodiment of the present invention. FIG. 12 is a cross sectional view showing the solid electrolyte fuel cell shown in FIG. 12.

As shown in FIG. 11, a unit cell 14 may be divided into a plurality of radially split segments. The unit cell 14 according to this embodiment consists of four radially spilt segments. Each segment is in the form of a sector with its tip portion being cut off along an arc of a concentric circle with the arc of the circle of the sector being as shown in FIG. 11. Unit cell 14 includes a cathode 14A, a solid electrolyte 14B, and a cathode 14C.

The separators each have a central part and a reaction part surrounding the central part. The respective central parts of the separators serve as manifold parts in which there are formed gas introduction holes 4 and 5 for introducing therethrough fuel gas and oxidant gas, respectively. The manifold parts of the separators have protrusions composed of a central disk portion and four ridge portions 50 radially extending from the central disk portion to the periphery thereof and arranged at right angles with respect to adjacent ridge portions. The protrusions are formed with grooves (not shown) for inserting the gas seal portion 6A (FIG. 2). The reaction part or region of each separator surrounding the manifold part thereof is formed with guide vanes 19A and 19B arranged on both surfaces thereof. The manifold part of each separator is formed with first gas flow holes (not shown) and second communication holes 10G having the same construction as the first gas flow holes but having a different height along the direction of the stack. The gas flow holes and communication holes are formed by drilling, and communicate with the gas introduction holes 4 and 5, respectively to lead fuel and oxidant gases to the guide vanes 19B and 19A, respectively.

The electric insulator plate 21, which is a dense disk made of ceramic, is provided with two through holes that match or are aligned with the gas introduction holes 4 and 5, respectively.

A fuel cell of the aforementioned type can be fabricated similarly to the solid electrolyte fuel cell of Embodiment 1, for example.

An oxidant gas is introduced through an oxidant gas introduction hole 5 and via gas communication holes 36E in the separator 11C into a gas uniform distribution chamber 35E, from which the oxidant gas is further led to the reaction part surrounding the manifold part via the second gas flow hole 10G.

A fuel gas is introduced through a fuel gas introduction hole 4 via gas communication holes to the gas uniform distribution chamber (not shown). The fuel gas is further led from the gas uniform distribution chamber (not shown) to the reaction part of manifold part through the first gas flow holes (not shown) but having the same construction as the first gas flow holes 10G.

The first and second gas uniform distribution chambers are arranged symmetrically on different main surfaces of the separator, respectively. The first and second gas flow holes are arranged on different main surfaces of the separator 11A, respectively.

Use of the unit cell 14 in the form of a plurality of radially split segments is advantageous since not only is it easy to fabricate but it is also less susceptible to thermal damage.

The unit cells may be those described in any one of Embodiments 2 to 9 described above along as they are in the form of a set of sectors.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A planar solid electrolyte fuel cell, comprising
a plurality of metallic separator plates each having first and second opposing surfaces, each of said separator plates including
a manifold part provided with first and second reaction gas introduction holes for introducing first and second reaction gases respectively to the fuel cell; and
a reaction part, surrounding said manifold part, provided with first and second sets of guide vanes, said first set of guide vanes being located on the first surface of said separator plate and the second set of guide vanes being provided on the second surface of said separator plate, the first reaction gas flowing between and being distributed by said first set of guide vanes and the second reaction gas flowing between and being distributed separately from said first reaction gas by said second set of guide vanes;
a plurality of annular unit cells, each of said cells including an anode, a solid electrolyte and a cathode superposed one on another, each of said annular unit cells being interposed between two of said separator plates;
a plurality of electric insulators, each of said insulators being positioned on the manifold part of a respective separator plate and having first and second through holes aligned with respective first and second reaction gas introduction holes in said separator plate;
first gas seal parts interposed between the manifold part of each of said separator plates and a respective electric insulator, said first gas seal parts preventing the escape of reaction gas from the reaction gas introduction holes in the manifold part of the separator plate; and
second gas seal parts interposed between respective peripheral portions of said unit cells and respective reaction parts of the separator plates interposed between each of said unit cells.

2. The solid electrolyte fuel cell as claimed in claim 1, wherein said first and second gas seal parts are each made of a mixture of glass and ceramic material.

3. The solid electrolyte fuel cell as claimed in claim 1, wherein said separators are made of a heat resistant metal.

4. The solid electrolyte fuel cell as claimed in claim 3, wherein said separators are made of a heat resistant stainless steel.

5. The solid electrolyte fuel cell as claimed in claim 1, wherein respective cathode sides of said separators are provided with an antioxidant layer.

6. The solid electrolyte fuel cell as claimed in claim 5, wherein said antioxidant layer is made of $LaXO_3$, wherein said antioxidant layer is made of wherein X is Mn, Cr or Co.

7. The solid electrolyte fuel cell as claimed in claim 1, wherein each of said unit cells is in the form of an annular plate formed with a single hole.

8. The solid electrolyte fuel cell as claimed in claim 1, wherein each of said unit cells comprises a plurality of radially split segments.

9. The solid electrolyte fuel cell as claimed in claim 1, further comprising a gas flow hole provided in the manifold part in each of said separator plates, said gas flow hole communicating through said reaction gas introduction holes in the manifold parts with the reaction parts of said separator plates.

10. The solid electrolyte fuel cell as claimed in claim 1, further comprising a gas flow hole and a gas uniform distribution chamber provided in the manifold part of each of said separator plates, said gas flow hole communicating said gas distribution chamber with said reaction gas introduction holes in the manifold parts of said separator plates.

11. The solid electrolyte fuel cell as claimed in claim 1, wherein said unit cell is a unit cell assembly having a porous substrate serving as one of said anode and said cathode, and said solid electrolyte and the other of said anode and said cathode being superposed on said porous substrate one on another in this order.

* * * * *